350-360 SR
OR 3,001,447
SEARCH ROOM

Sept. 26, 1961 M. PLOKE 3,001,447

IMAGE REPRODUCING DEVICE FOR VISIBLE AND INVISIBLE RADIATION IMAGES

Filed Aug. 26, 1958 5 Sheets-Sheet 4

Sept. 26, 1961 M. PLOKE 3,001,447

IMAGE REPRODUCING DEVICE FOR VISIBLE AND INVISIBLE RADIATION IMAGES

Filed Aug. 26, 1958 5 Sheets-Sheet 5

1

3,001,447

IMAGE REPRODUCING DEVICE FOR VISIBLE AND INVISIBLE RADIATION IMAGES

Martin Ploke, Preetz, Holstein, Germany, assignor to Zeiss Ikon A.G. Stuttgart, Stuttgart, Germany Filed Aug. 26, 1958, Ser. No. 757,428
Claims priority, application Germany Aug. 29, 1957
15 Claims. (Cl. 88—61)

The present invention relates to a reproducing device for visible and invisible radiation images by employing a photo-semiconducting radiation-receiving surface.

At the present time there are available for reproducing of radiation images, in addition to optical means, also electronic means. When electronic devices are used, the radiation image is projected onto a photo-electrically active surface and appears as a self-illuminated luminescent image on a reproducing surface which is coated with a luminescent material. The image transmission from one surface to another is effected electrically. Owing to the energy supply connected therewith a visible image of greater brightness can be presented when the electronic equipment is suitably dimensioned.

In some application fields, particularly in cases when a high degree of brightness is required, the use of luminescent material for the reproducing surface demands a certain limitation. The image quality usually obtained with optical devices cannot be attained with luminescent materials. The same applies to the brightness and adaptability with respect to the size of the image. It was, therefore, already suggested for the purpose of projecting large television pictures to use for the image reproducing tube not a luminescent screen, but a receiving screen for the cathode rays which act as a light relay (modulator). Such a screen will produce local shades in similar manner in which a diapositive shades the light coming from a separate reproducing light source and thus permits the projection of the television image. As an example may be mentioned the process of television transmission and reception known under the trademark Eidophor. In such a process, the cathode ray of the receiving tube changes the form of the surface of a transparent liquid.

This surface structure of the liquid, which changes from place to place, is transformed into locally arranged shading off by means of a Schlieren optical system. The other optical path of rays will be a conventional projection. Compared with television, an image converter is technically less complicated. An electron-optical image converter, designed in form of a vacuum tube and operating according to the photo-electric principle, permits only a relatively small brightness amplification. The image converter having only a small fluorescent screen disposed in an evacuated vessel, is generally suitable only for subjective picture viewing. It is a substantial improvement to produce image converters with a large reproducing surface, which is operative without a vacuum. Such image converters constitute substantially a combination of a photo-semiconductor and a luminescent screen, which later operates on the principle of an electrical luminescence effect. An objective image observation is thus possible with a so-called solid-body image converter. The receiving and the reproducing surfaces are in direct operative relation to each other and are of approximately the same size.

But also the conventional solid-body image converter is not completely free from the disadvantages connected with the use of the fluorescent substances, which will thus reduce the applicability of this image amplifier in optical devices or for projection purposes.

Since the light emission of luminescent substances follows substantially Lambert's cosine law, the optical reproduction of the luminescent surface is connected with substantial losses of light and, therefore, requires a powerful optical system.

It is an object of the present invention to eliminate the use of a luminescent image and employ the light of a separate source of light for a direct image control. The brightness and the dimensions of the reproduced image will then be substantially influenced by the brightness of the separate light source and the properties of the optical path of the rays. The ray sensitive surface and the projection screen may be arranged spaced from each other and concerning the obtainable brightness, there are no principle limitations.

In accordance with the invention, there is produced an image reproducing device using a photo-semiconducting ray receiving layer which is particularly suitable for producing an areal distributed electric resistance image from an optical radiation image. The present invention, therefore, provides a photo-semiconducting layer which is subjected to the influence of the radiation image to be reproduced, whereby a reflecting layer which is not optically influenced by the radiation image, but which is illuminated by an additional source of light and whose optical properties may be locally varied over its surface, is associated with said photo-semiconducting layer. The local distribution of the optical properties is electrically adjustable by a local distribution of the resistance value of the photo-semiconducting layer in such a manner that the local distribution of the vectors of the reflected light from the additional source of light is controllable in its direction, phase and amount, in dependence of the local distribution on the resistance image in the photo-semiconducting layer, at least in one of these vector properties, so that the reproduced image which has been made visible by means of conventional optical means corresponds to the radiation image produced on the photo-semiconductor.

The photo-semiconductor can be arranged in series with a non-photo-semiconductor, and the reflector, if desired, may be combined with an additional layer, the optical properties of which can be electrically controlled.

It is also advantageous to provide intermediate layers in addition to the above described layers, which intermediate layers serve as supporting foils, adhesive layers and also as light barrier layers in order to prevent an optical feed-back. In the preferred embodiment of the invention, the photo-semiconductor and/or the reflector are provided with a scanning pattern.

The reproduction device of the present invention represents a photo-electronic light relay or a so-called light valve. In such relays, which consist of two layers, which change their distance from each other under the influence of the primary radiation and in which the additional or secondary radiation source is disposed in such a manner that this radiation reaches the inner boundary surface of the adjacent layer within the angular range of the total reflection, it has already been suggested to employ one of the two layers in the form of a thin coating, which will absorb the primary radiation and which will be heated and expand under the influence of said radiation. It is obvious that the thermal expansion due to the absorption of the rays will have a reaction several times smaller than the arrangement of this invention.

The technical advance obtained by the present invention permits a universal employment of the same for optical devices of all types. A particular advantage of the invention is obtained when used in devices requiring high light power, such as for instance, television and large picture projection, reproduction of infra-red, ultra-violet, X-ray and atomic radiation pictures. It can also be used in other optical devices, such as photographic cameras, microscopes, spectroscopes, etc. In all these cases, the light relay can be used for image presentation or image amplification.

Other features of the invention will be described and will be obvious from the following description and from the claims appended thereto. The description has reference to the accompanying drawings, in which:

FIG. 1 shows schematically a reproduction arrangement of the prior art, the

Figure 1:
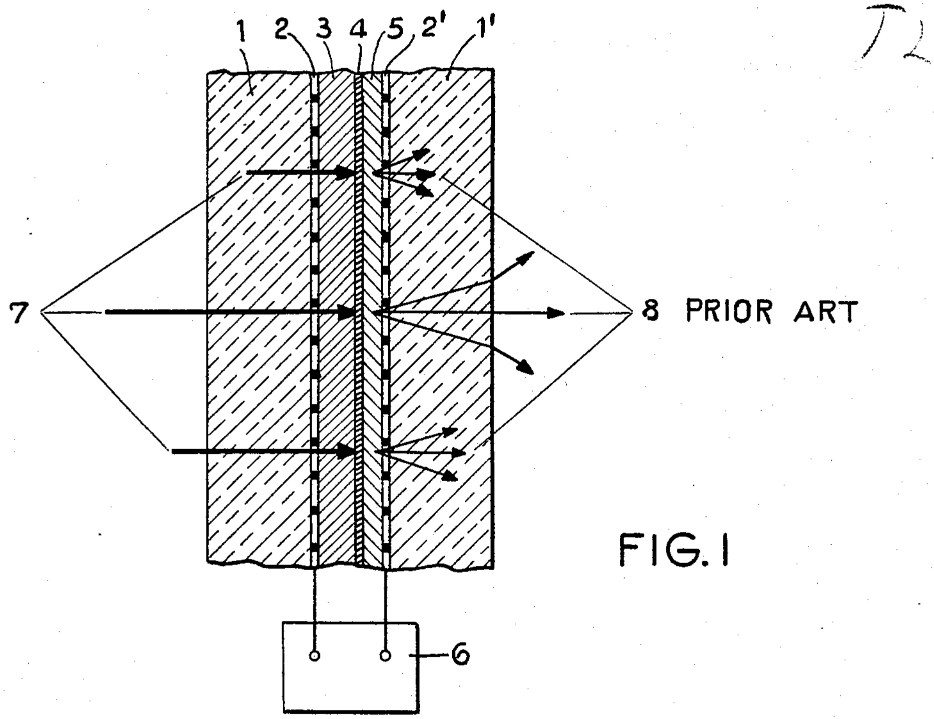

According to FIG. 1 the solid body image converter consists of the two glass plates 1 and 1', of which the surfaces facing each other are covered with conductive transparent layers 2 and 2'. A photo-semi-conducting layer 3, a dark light separating layer 4 and an electro-luminescent layer 5 are arranged between the above mentioned layers 2 and 2' in the sequence named. For operation, the conducting layers 2 and 2' are connected to an alternating current source 6. The arrows 7 indicate the direction of the rays of the radiation image which is to be amplified. The arrows 8 indicate the direction of the reproducing light which is radiated by the electro-luminescent layer 5.

The operation of the device is as follows: The photo-semiconducting layer 3 has the property of assuming a small resistance on the illuminated portions, while the resistance on the non-illuminated portions will be substantially higher. On the other hand, the electro-luminescent layer 5 has the property of lighting up when it is subjected to an electric alternating field of sufficient magnitude. The alternating current resistances of the layers 3, 4 and 5 are so adjusted that the layer 5 will light up under the influence of the applied voltage when the photo-semiconductor 3 is illuminated, but will remain dark when no illumination takes place. Since the illumination strength changes in accordance with the content of the image from place to place (see arrow 7), the reproduced light 8 will have a distribution of the brightness which corresponds to that of the original image. An optical feed-back between the layers 3 and 5 is prevented by the light separating layer 4. From the point of view of illumination, it should be noted that the electro-luminescent layer produces light by itself, i.e. is not controlled by alien light as in the case of a Lambert radiator which emits non-directional light, regardless of whether the photo-semiconductor is illuminated by directional or diffused light.

Contrary to this arrangement of the prior art, the light relay of the present invention operates on its reproduction side not as a source of light, but as a locally controlled mirror, which reflects the light coming from an alien light source, according to the special modification, either directionally or with a desired diffused characteristic.

Figure 2:
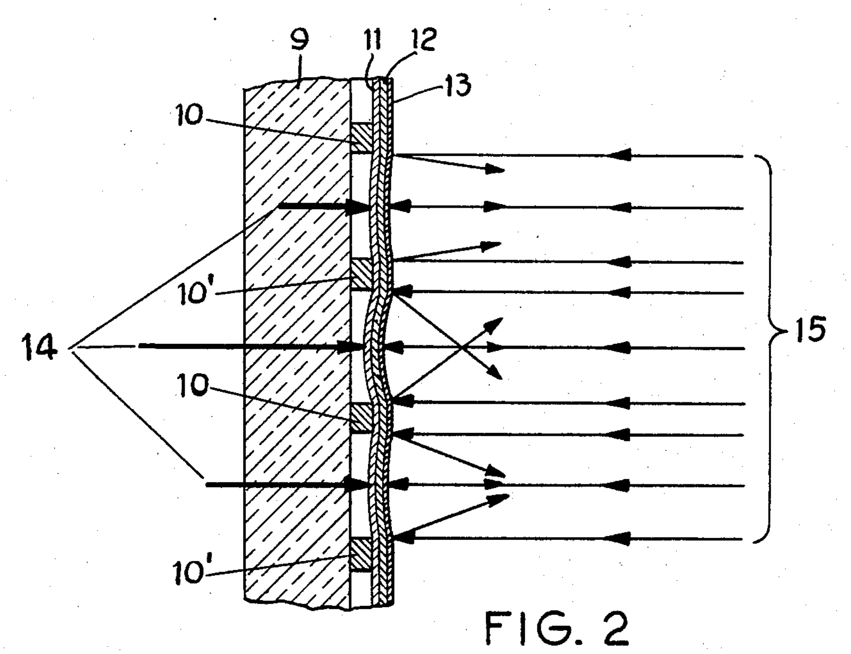
FIGS. 2, 5, 8, 9 and 10 show each a different device in accordance with the present invention.
Figures 3, 4:
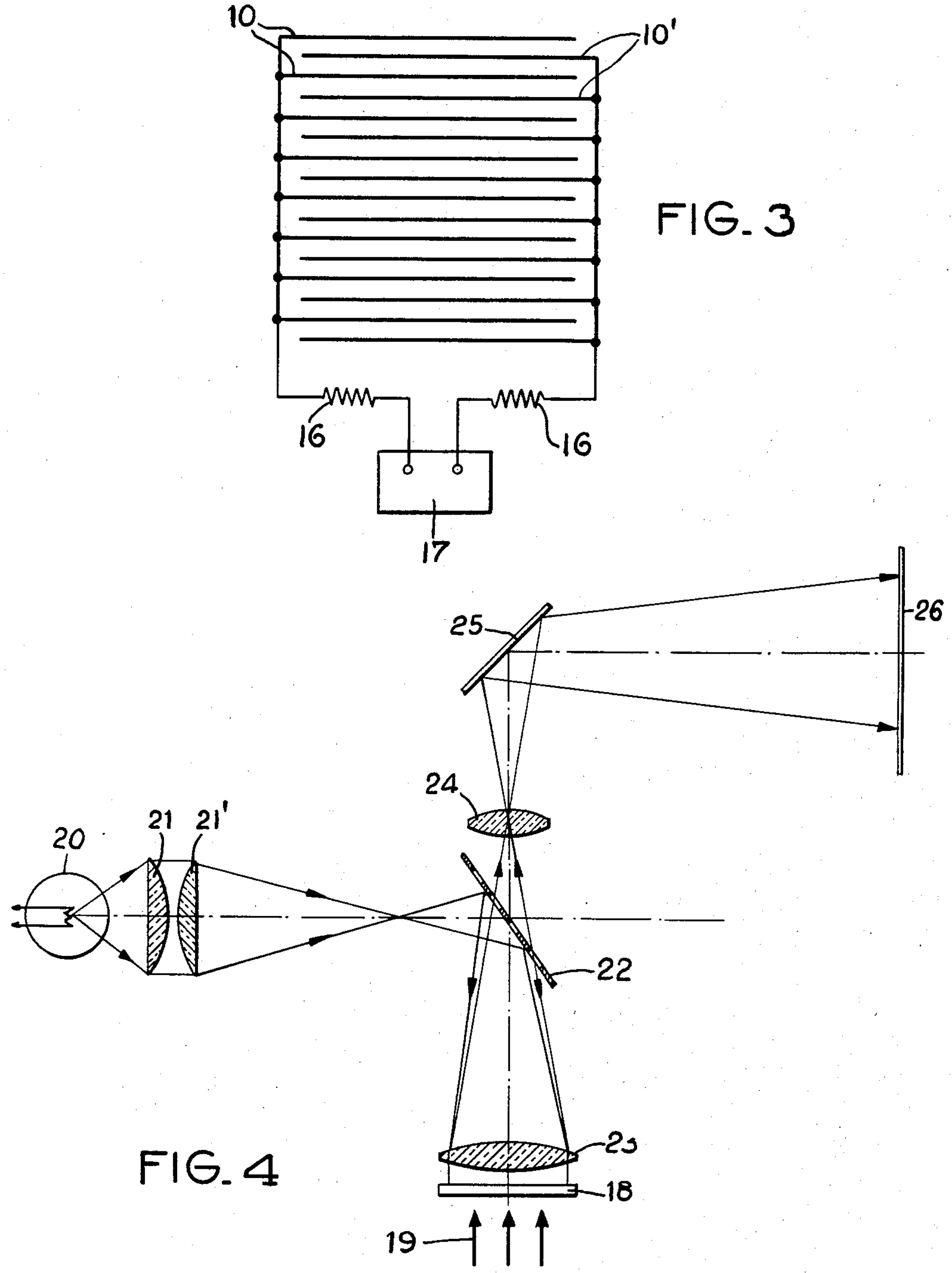
FIG. 3 shows the arrangement of the electrodes, and the FIGS. 4, 6 and 7 show the optical paths of the rays of several reproduction possibilities, partly by projection, partly by subjective observation.

The present invention will now be described on hand of FIG. 2 which shows a glass support 9 on which is provided the electrode scanning screen 10, 10'. FIG. 3 indicates that the electrodes 10, 10' intermesh with each other in form of the teeth of two combs. The electrodes are connected over protective resistances 16 to the voltage source 17. The mentioned electrode scanning screen may be applied to the glass support 9, for instance by means of a photographic-plating method, similar to the method of producing stereotype plates. The support is coated with a glass or collodium foil 12, which is coated on the side facing the electrode scanning screen 10, 10' with a photo-semiconductor 11, while the opposite side of the foil is provided by vaporization with a mirror coating 13.

The operation of this device of the invention is as follows:

Under the influence of the rays 14, a photo-electric current of locally different size is produced inside of the photo-semiconductor 11 and passes to the electrodes 10, 10'. The heat produced by the electric current is transferred to the carrier foil 12, which will curve locally to different extents. As a result, differently curved micro-mirrors will be formed on the non-illuminated and originally flat mirror coating 13, depending upon the strength of illumination of the layer 11. Therefore, this device constitutes a light relay which will control the direction of the reflected light in accordance with the image.

In order to transform the directional control into an intensity control and for the purpose of creating the image to be reproduced, the path of rays may be used as is shown in FIG. 4. The light relay 18 receives on the side of the photo-semiconductor the ray image 19, and on its mirror side the light coming from a separate light source 20. The illumination path includes the condenser lenses 21, 21', a mirror 22 which is inclined under 45° and which consists of several mirror strips, the spaces therebetween being transparent, and a lens 23. The reproducing light, after reflection by the mirror of the light relay 18, passes again through the lens 23 and again reaches the mirror strip 22. When the mirror of the light relay is flat, the mirror strips 22 will block the passage of the light; but when under the influence of the rays 19 the above mentioned micro-mirrors are formed, the light will be able to pass through the transparent spaces between the mirror strips 22 and will then reach the objective 24 and the mirror 25, which deflects the same onto the projection screen 26. The objective 24 is adjusted in such a manner that it will project the mirror surface of the light relay 18 onto the projection screen 26. The image of the mirror surface is locally differently illuminated in accordance with the different curves of the micro-mirrors. Therefore, there will appear on the projection screen an image which is superimposed by a structure image of the mirror surface of the light relay. In order that this structure does not interfere, the distance between the adjacent electrodes 10 and 10' in FIGS. 2 and 3 should be selected to be sufficiently small. This distance determines the magnitude of the dissected image element.

Figure 5:
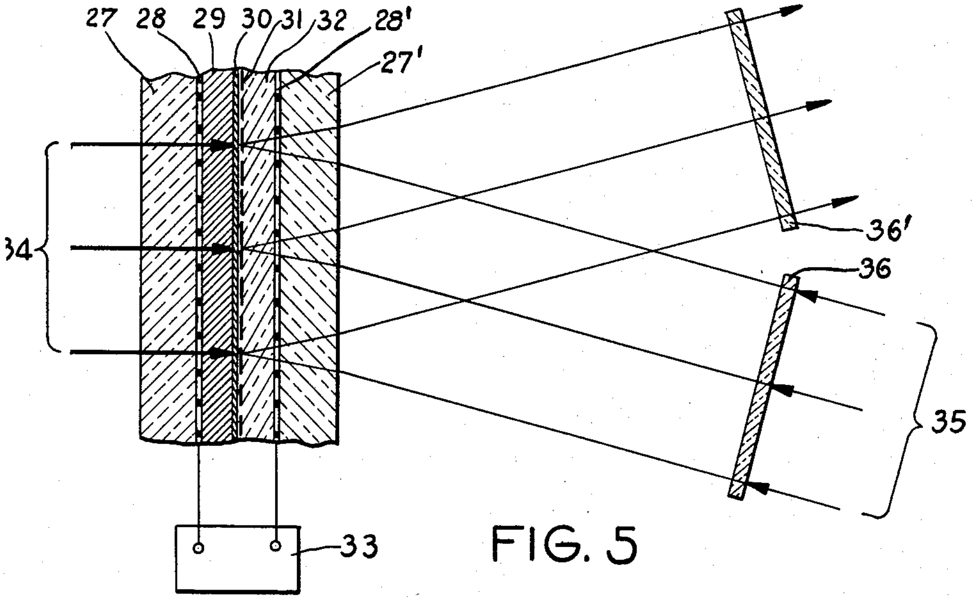

FIG. 5 shows a further modification of the light relay in accordance with the present invention. In this modification, the photo-semiconductor layer 29, the light separating layer 30, the metallic screen or interference mirror 31 and the crystal-mosaic 32 are disposed between two glass plates 27, 27' which are provided on their opposing faces with conductive transparent coatings 28, 28'. In this particular case are used transparent oriented crystals, which are capable of developing an electro-optical effect in the field direction. Crystals of this type consist, for instance, of sphalerite, the primary phosphates of potassium and ammonium, or other crystals of the ferro-electric group. During the operation of the device, the electrodes 28, 28' are connected to a voltage source 33. The arrows 34 indicate the direction of the primary radiation; the arrows 35 indicating the direction of the separate light source. 36 and 36' are two crossed polarizers. This light relay modulates the light phase into two oscillating directions which are at right angles to each other. The primary effect of the light illumination consists in the change of the field distribution between the layers 29 to 32. The crystals 32 are, therefore, exposed to a locally different field. In order to obtain a maximum effect, the crystals are oriented in such a manner that their optical axes are arranged parallel to the field direction while their crystalline secondary axes form an angle of 45° with the forward direction of the polarizer 36.

The control is carried out in such a manner that the photo-semiconductor 29, which is in a non-illuminated condition, will practically absorb the whole operating voltage owing to its very high resistance, while the crystals 32 will remain practically field-free because of their relatively small resistance. The light which is reflected by the mirror 31 will, therefore, not be influenced when the photo-semiconductor remains in a non-illuminated condition and cannot pass through the analyzer 36′ which is in its blocking position. If, however, the photo-semiconductor 29 is illuminated, the latter will have only a small resistance compared with the resistance of the crystal-mosaic, so that the voltage drop will be displaced towards the crystal-mosaic when the strength of the illumination increases. In such a case, the polarized light from the separate light source, which is plane polarized by the polarizer 36, will be transformed more and more into an elliptical oscillating condition due to the action of the electro-optical effect. This light will be, therefore, able to pass through the analyzer to a gradually increasing degree. The polarization path will thus transform the phase control into an intensity control so that the mirror surface causes the light, which passed through the analyzer, to be projected by an objective onto a projection screen where it can be subjectively observed. In order not to disturb the control operation, the mirror coating should have only a very small transverse conductivity. For this purpose, this coating is made of a semiconductor or of metallic screen or of an interference coating. In place of a plane polarizer, a circular polarizer may also be used.

A light relay having a mosaic made of electro-optically reacting crystals, has already been employed heretofore in projecting images in television. The image reproducing device of the present invention differs from the mentioned device in this, that no vacuum tube with cathode rays is required for the modulation of the crystals, because the photo-semiconductor used in the present invention can be used without any use of a vacuum. Furthermore, the prior device for reproducing the image requires a television installation equipped with a special television pick-up tube. Such a television installation is much more expensive and complicated and is also uneconomical and is subjected to more disturbances and operation difficulties than the light relay of the present invention.

Figure 6:
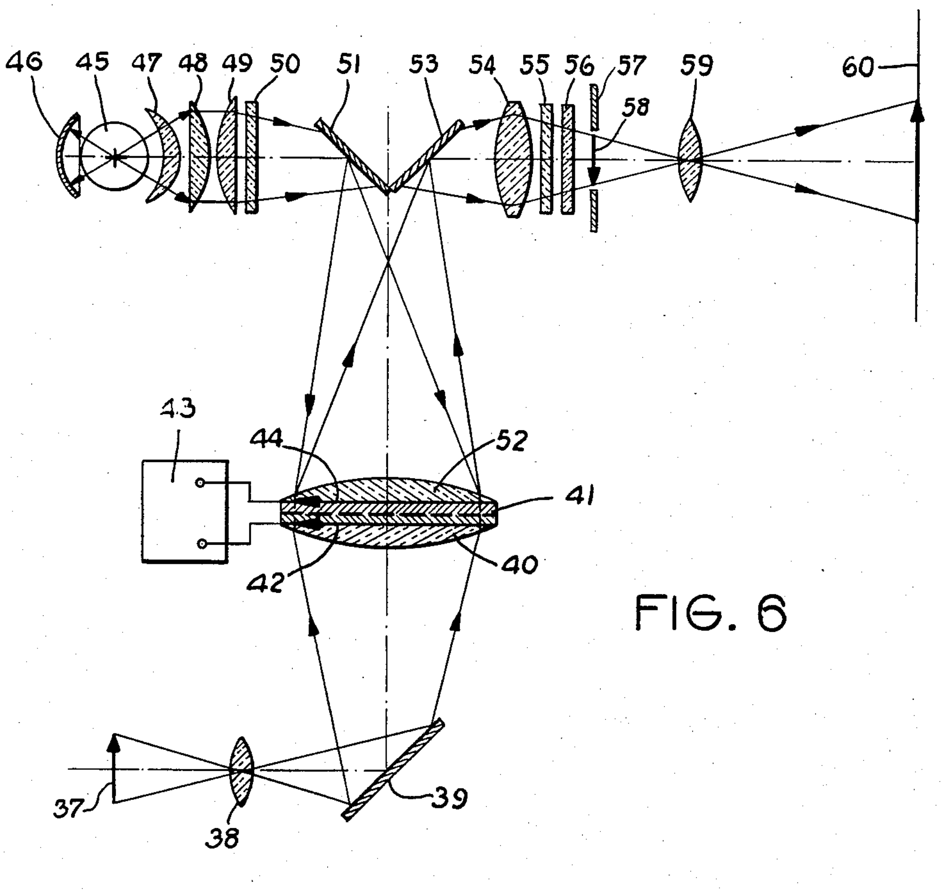
Figure 7:
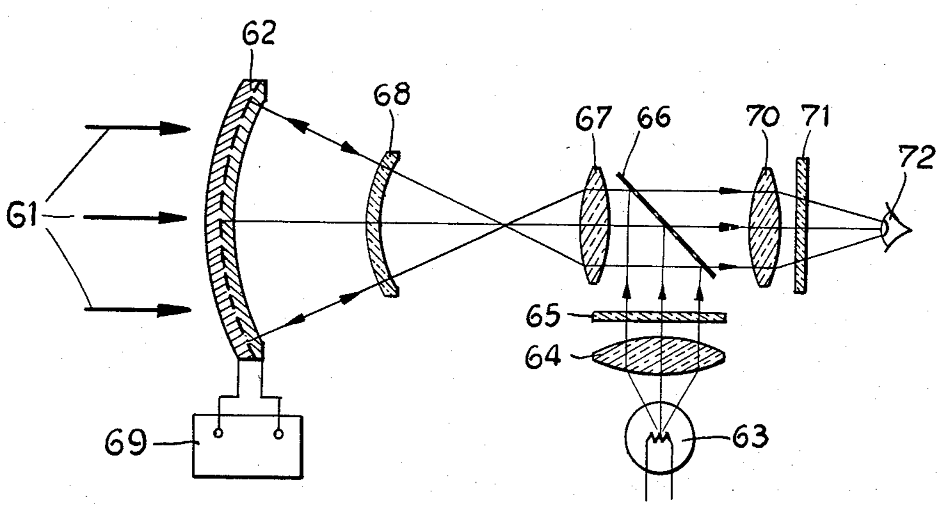

The installation for projecting a radiation with a light relay in accordance with FIG. 5 may also be designed as shown in FIGS. 6 or 7, depending upon whether the arrangement is made for subjective observation or for a geometrical or physical beam division. In the projecting arrangement of FIG. 6, employing a geometrical beam division, the object or image 37 to be reproduced is projected by an objective 38 onto a deflection mirror 39, which mirror is also used for beam division and directs the image into the field lens 40 on one side of the photo-semiconductor of the light relay 41, where a radiation image 42 is produced. A conversion of the radiation image 42 into a latent optical image 44 will then take place inside of the light relay 41, which is under the influence of the voltage source 43, said optical image 44 at first being noticeable only in the form of locally different polarized optical crystals and being made visible only by means of the reproducing rays.

On the reproduction side of this arrangement is arranged a light source 45, preferably in form of a high intensity, for instance, a xenone lamp. The condenser consists of an auxiliary spherical mirror 46 and the lenses 47, 48 and 49. The light passes through the polarizer 50 and is deflected by the mirror 51 towards the lens 52, which latter has the purpose of producing a tele-central path of rays directed onto the crystal side of the light relay. This arrangement is necessary because an electro-optical effect which is free from natural double refraction can be observed only when the incident light is parallel to the optical axis.

The light from the light source 45, which is reflected by the light relay 41, is changed with respect to its polarization condition by the latent image 44 and then passes for the second time through the lens 52, is deflected by the mirror 53 and produces a real image 58 in the plane of the image window 57, after having been passed through the objective 54, the compensator 55 and the analyzer 56. This image 58 corresponds in its brightness distribution to the object 37, but in its intensity the image depends only upon the intensity of the separate light source 45. The compensator 55 is used, when necessary, for the compensation of the disturbing action of the natural double refraction of the crystals, which occurs in case of large apertures of the illumination path. For this purpose the compensator consists of a medium which has a double refraction, but in opposite direction. Not only crystals can be used as a material for the compensator 55, but also a mechanically stressed homogeneous transparent body, for instance, glass which will produce a double refraction when mechanically tensioned. The compensator is preferably disposed at a place in the path of the rays at which the apertures are larger than at the position of the light relay, for instance, in the proximity of the image window 57. The purpose of the analyzer 56 is to transform the phase-changes which are produced by the electro-optical effect, into changes of intensity. A conventional projection objective 59 will finally project the intermediate image 58 onto the image screen 60.

An optical arrangement, as shown in FIG. 7, can be used in case the reproduced image is to be only visually observed and is not projected. In FIG. 7, the numeral 61 designates the radiation image which is symbolically indicated by arrows. 62 is the light relay and 63 the reproduction light source, for instance, an incandescent lamp. The illumination of the light relay on its crystal side is effected by the lens 64, the polarizer 65, the semi-transparent mirror 66, as well as the lenses 67 and 68. The ray division is effected in this modification by physical means. The light relay shown in FIG. 7 differs from that of FIG. 6 in this, that same is not plane but has a curved form similar to a concave mirror. This has the advantage that the lens 52, which according to FIG. 6 was provided for obtaining a tele-centrical path of the rays, can be eliminated. Thus, in cooperation with the meniscus 68 an image reproduction of high quality will be obtained. In operation, the light relay will be connected to the voltage source 69. The viewer's eye 72, which observes the light relay 62 through lenses 68, 67, and 70, will see the reproduced image at the place where the light relay is arranged. In case the semi-transparent mirror 66 is designed to simultaneously have the properties of an interference polarizer, the polarizers 65 and 70 can be eventually eliminated, or can be replaced by weaker polarizers, because the interference polarizer 66 will act as a polarizer in the illumination path and will also act as an analyzer in the reproduction path. The modification of FIG. 7 is primarily used in portable devices.

Figure 8:
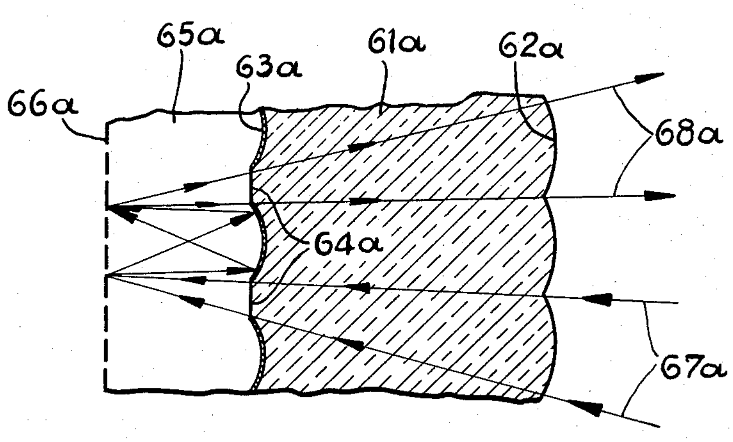

When crystals of primary potassium phosphate are used for light control, the voltage required for the full modulation of light control characteristics will be approximately 3000 volts at a double passage of the light. Even though a voltage of such a magnitude can be applied safely to high ohmic semiconductors, it is in many instances desirable to reduce this high voltage. This is made possible, for instance, by cooling of the crystals, because the produced effect increases with reduced temperature. Another possibility is by replacement of hydrogen atoms by deuterium in the compound used, for instance, $KH_2PO_4$. This objective can also be obtained by geometrical means. For this purpose, the arrangement is such that the light passes several times through the light control layer. FIG. 8 illustrates one of a number of modifications which may be used for a multiple passage of the light. This FIG. 8 shows a detail of the basic arrangement of FIG. 5. The change consists in a modified construction of the glass support 27′. The glass support 61*a* in FIG. 8 consists of cylindrical convex lenses 62 arranged on the outer surface of the support 61*a*, and concave mirrors 63 arranged on its inner surface. The concave mirrors 63 alternate with plane transparent surface strips 64. The crystal mosaic is indicated at 65 and the mirror screen at 66, which parts are designated in FIG. 5 with 32 and 31. The arrows 67 and 68 indicate the direction of the incident and reflected light rays respectively. The incident light 67 is reflected by the mirror screen 66 and then reaches the concave mirror 63 and is again concentrated onto the mirror screen 66 and penetrates outwardly after the light rays have been directed parallel by the convex lens 62.

Figure 9:
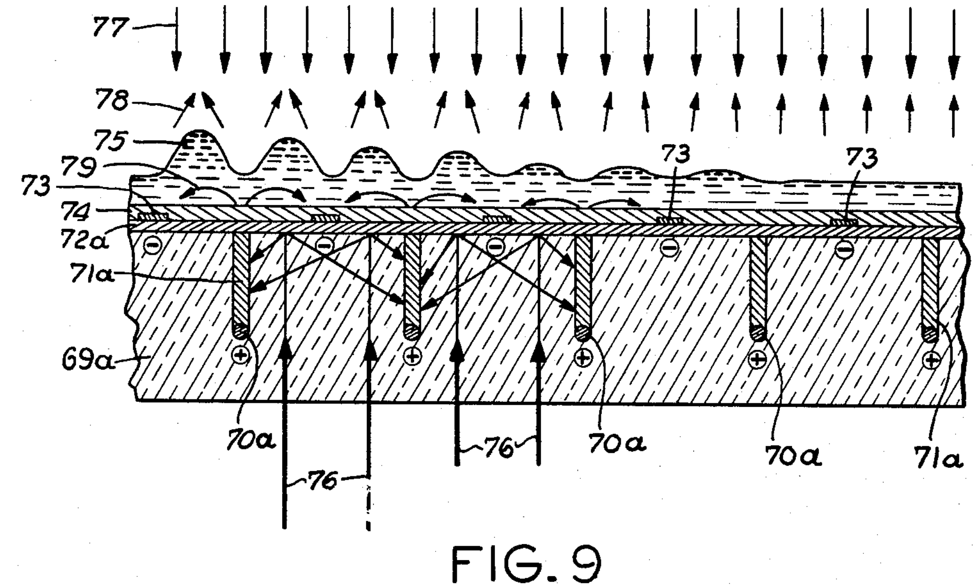

Another object of the invention is a light relay which comprises in combination a liquid, a mirror and a photo-semiconductor. Such a light relay is shown in FIG. 9 and can be regarded as a photoelectric counterpart to the Eidophor cathode ray tube. In FIG. 9 a transparent plastic support 69 is provided with line-shaped recesses, connecting wires 70 and a photo-semiconductive coating 71. The support 69 is coated with a semiconducting but not photo-electric light separating layer 72, which corresponding to 71 carries line-shaped conductive strips 73, a non-conductive mirror layer 74 and a dielectric liquid 75. The arrows 76 indicate the incident rays of the radiation image, and the arrows 77 indicate the direction of the separate light. When the surface of the liquid 75 surface is not plane, said separate light will be reflected depending upon the inclination of the liquid surface which will reflect light under different angles from the mirror coating 74 and will leave the light relay in the direction of the arrows 78.

In this case, the control action is based upon the electrostriction. When the electrodes 70 and 73 are connected with a voltage source, for instance, a direct current voltage with (+) and (−) indicated poles, an electric field, which is indicated by the arrows 79, will be created at the places at which the photo-semiconductor is illuminated. It is assumed that the photo-semiconductor has a smaller resistance, when illuminated, and a higher resistance, when not illuminated, when compared with the layer 72. Due to the electrostrictive effect, the liquid level will curve in the above indicated sense at places at which the electric field 79 is active. There will be formed micro-lenses which will influence the light rays in the sense indicated by the arrows 78 with regard to their direction. The local deformation of the surface of the liquid can be made visible in a conventional Schlieren path, similar to that shown in FIG. 4. The screen pattern of the electrodes and of the photo-semiconductors respectively is an important feature in this arrangement, in order that in uniform illuminated image portions a periodical curving of the liquid surface takes place.

Figure 10:
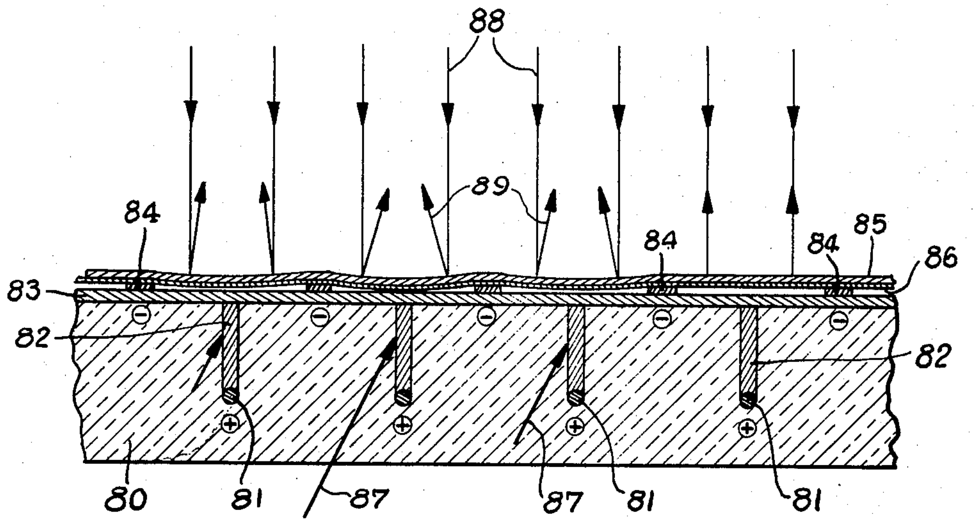

FIG. 10 shows a cross-sectional view of a light relay which differs from the arrangement in FIG. 9 in this, that the liquid is replaced by a diaphragm having a mirror-like surface. The essential parts of this device consist of plastic support 80, the electrodes 81, which are electrically connected to each other and are made of wire, conductive coating or similar material and which are in contact with the photo-semiconducting layer 82. 83 designates again a coating of constant conductivity which supports the conducting strips 84, which are conductively connected with one another. These strips are supporting at the same time a foil 85 which preferably is provided with a conductive mirror coating 86. When a direct or alternating voltage is applied to the electrodes 81 and 84, a curving of the foil will occur in similar manner and under similar conditions as in FIG. 9. The amplitude of the curves depends upon the illumination intensity (arrow 87) of the photo-semiconductor. The action of the illumination corresponds to that of a condenser microphone. At places which are particularly strongly illuminated, the resistance of the photo-semiconductor will be reduced to such an extent that at these places nearly the entire operation voltage will be required between the mirror coating 86 and the portion of the semiconductor 83 which is disposed between two strips. At these places the foil is attracted by the layer 83 and curves in the indicated sense. The result is again a directed control of the incident separate light rays 88, as is indicated by the arrows 89. For reproduction can be used again the path of the rays as shown in FIG. 4. It should be noted that the arrangement shown in FIG. 10 is operable also when the layers 82 and 83 are reversed. The same applies also to the layers 71 and 72 in FIG. 9.

In some cases it is advantageous to use a modified Schlieren system, which substantially corresponds to the embodiment shown in FIG. 5 and FIG. 6 respectively, and differs from same only in this, that the polarizers 50 and 55 are replaced by line or cross screens which are associated with each other and that the compensator 56 is eliminated. The form and the arrangement of same are selected to be such that, for instance, in case the crystal light relay 41 of FIG. 6 is replaced by a relay according to FIG. 2 or 6, the light passage will be blocked as long as the relay is not illuminated. While in the arrangement according to the FIG. 4 for the illumination and the reproduction, the same screen 22 is used, a separation into two screens has the advantage that the mirror surface of the foil 13 in FIG. 2 and 86 in FIG. 10 need not be of very high precision. It is particularly possible, in case of a non-illuminated light relay, to obtain darkness when the micro-mirrors are already curved in their starting position. When the curvature of the mirror surface is very substantial, it will be necessary to bring the screen 55 closer to the lens 52, so that the light of the illuminating rays can reach the relay surface through the gaps of this screen.

This modified radiation path makes it possible to make distance between the surface 83 and 86 in the light relay of FIG. 10 adjustable, so that the curves in the mirror surface will attain a value which will correspond to said distance. In accordance with the invention, the adjustment of this distance is made by pneumatic means in that the outer space of the light relay is subjected to a pressure which is different from the pressure between the surfaces 83 and 86. At the same time a certain amount of super-pressure is created in said two spaces in order to prevent an electric discharge between the above two surfaces. The same purpose could be obtained by placing the foil in a dielectric liquid. Certain advantages can also be obtained by varying the atmosphere in the light relay of FIG. 2. The advantages of this arrangement are the raising or stopping of the heat dissipation and the possibility of adjustment of the time constants to a predetermined value. Particularly the light relay of FIG. 2 will obtain storing properties when a vacuum is employed. The reproduced image will remain visible even after the primary radiation has been discontinued. The same effect can be obtained also when employing an inert photo-semiconductor, but variations of the atmosphere or of the air movement in the proximity of the relay permit a change of the inertia in wide limits.

Another possibility for producing elastic deformation is given by the inverse piezoelectric effect of quartz and of the ferro-electrica, such as, for instance, Rochelle salt. A mosaic of accordingly oriented crystals which are provided on their surface with a conductive mirror coating, which simultaneously acts as electrodes, will curve from place to place according to the field tension and will also form micro-mirrors, when the piezoelectric direction of the main deformation and the electric field are the same. Important is the formation of a screen of the photo-semiconductor in order to obtain a periodical curving also when the radiation is constant.

A light relay which is based upon a pure intensity control may be built principally according to FIG. 5, in which instead of the crystals 52 an intensity controllable medium is provided and in which the illumination and observation of the relay surface takes place with the polarizer 36, 36′ eliminated. Such a medium may consist of a suspension of plate-shaped bodies in a dielectric liquid. By an appropriate selection of the impedance of this medium, a field intensity inside of the medium can be obtained which is at right angles to the place of the relay and which intensity depends upon the illumination of the photo-semiconductor. The field intensity will effect an orienting of the plate-shaped bodies. The suspension of said plate-shaped bodies will remain opaque in case the photo-semiconductor is not illuminated, i.e., without any field, so that said plate-shaped bodies will not be oriented but irregular. But when the illumination increases, i.e., when the field strength increases, said medium will become more and more transparent, and an image will appear at the place of the suspension which can be viewed directly, or can be reproduced in reflected light. In case of direct viewing, it is advisable to provide a slight dispersion to the mirror 31, while the optical projection of a plane surface is advisable, or as shown in FIG. 7, a curved surface may also be used.

In all the modifications of the invention, the reproduced image will appear at the place of the reflector or in the medium in front of the reflector respectively, and it is important that the reflector or the light control medium respectively, is carefully produced, so that the reproduced image is free from any defects which may occur due to defective control operation. In some cases, for instance, in the assembly of ground and polished crystals to a mosaic, an image structure influenced by the abutting edges of the crystals cannot be entirely avoided. In accordance with the present invention, it is suggested to eliminate the eventually present distorting structure by a relative movement of the relay surface relative to the path of the rays. If, for instance, the arrangement is such that the relay surface rotates in a plane vertical to the path of the rays, new surface portions of the relay will continuously move into the range of a certain image portion, so that the distorting structure will be eliminated by the formation of the mean value of the light control effect. Instead of moving the relay, it is possible to displace the path of the rays to both sides of the relay surface. This can be effected, for instance, in case of FIG. 6 by a synchronous tilting motion of the mirrors 39, 51 and 53. The tilting motion can be of continuous or intermittent nature in one or preferably two directions which are vertical to each other. The amplitude of this motion should be such that the reproduced image 60 itself is not moved. When projecting film or television images, it is advisable to have the tilting motion of the mirror perform in a manner of saw-tooth oscillation, whereby the return movement of the mirrors takes place during the advancing movement of the image.

The reproduction of color pictures with the above described device does not present any particular difficulties. This can be effected in its simplest modification by means of two groups of three filters each, rotating around the same axis; said three filters corresponding to the three color separations. One of these groups is arranged on the side of the photo-semiconductor, and the other on the reproduction side of the relay. By the adaptation of the filter color to the spectral characteristics of the photo-semiconductor, a life-like reproduction of color is obtained, and if necessary, even a certain correction of the color of the picture. By appropriate transmission characteristics of the filters, it will be possible to transpose the discrete wave ranges of the invisible spectrum into visible color pictures. In case the light relay, in accordance with the present invention, is used, for instance, for presentation of ultraviolet images, it is possible to transpose the short-wave ultraviolet into blue, the middle wave into yellow-green and the long wave into red. Another possibility for color reproduction consists in the use of three light relays with stationary filters, corresponding to the three color separations. In this case, the three reproduced images are projected one upon the other, or are transmitted by means of partly transparent or dichroic mirrors into the same optical path.

The spectral characteristics of the photo-semiconductor can be varied in a wide limit by appropriate selection of the basic materials and of the activators. For the visible spectral range can be used, for instance, CdS, ZnS, $Sb_2S_3$ or the corresponding oxides. Suitable activators are, for instance, Cu, Ag, Sb, and Bi. For the ultraviolet and the X-ray fields, the semiconductors made of PbO and Se may be used, preferably Se in its amorphous form. Photo-semiconductors which are sensitive to infrared are, for instance, $Tl_2S_3$, PbS, PbSe and PbTe, which are activated by oxygen. The semi-conducting elements Ge and Si as well as the inter-metallic compounds of three-valent and five-valent metals are rather important materials in connection with this invention.

The speed of response of the light relay depends among other factors upon the operation temperature, the material and the conductivity of the photo-semiconductor. When a low inertia is desired, the photo-semiconductor is preferably additionally irradiated by a long wave light. High inertia can often be obtained by high resistance semiconductors which are cooled down to a temperature below room temperature. A slow-acting light relay is capable of image storage, which is, for instance, desirable in observation of short time phenomena and in diagnostic radioscopy. When employing the flashgun technique in these cases, which consists in an intensive illumination of an object for a very short period of time only, the object can be observed with the use of a storing light relay for a certain period of time after the flash. When high resistance photo-semiconductors such as Se and PbO are used for these storage light relays, by reasons of adaptability, the non-photo-semiconductors which are combined with said photo-semiconductor, must also have a high resistance. Said non-photo-semiconductor may, for instance, consist of a mosaic of crystals having an electro-optical effect. The light modulation effect often permits a varying of the time constant. When an elastic diaphragm is used, the time constant can be influenced, as mentioned in the above, by the type of the surrounding media whereby the thermal conductivity and the viscosity of the media are of particular importance. In accordance with the present invention, the photo-semiconductor is brought into an optical contact with radiation sensitive luminescent materials. This possibility is of a particular interest in reproducing X-ray and atomic radiation images. In such cases the radiation images are first changed by luminescent material into a visible fluorescent image, which will subsequently indirectly influence the photo-semiconductor. The use of luminescent materials producing an afterflow would also increase the storage effect of the respective semiconductors. When the photo-semiconductor is selected in such a manner as to selectively reproduce visible and invisible images, the intensity of the radiation ranges can preferably be adjusted by filters. When, for instance, an X-ray image or the visible picture of an object which was diagnostically radioscoped, is to be reproduced, the room-light may be disturbing to the diagnostic radioscopy. This room-light, however, may be kept out from the range of the light relay by means of an aluminum foil which acts as a filter. When these images are to be reproduced, the foil is removed again.

In some cases, the reflector of the light relay may be provided in place of a smooth surface, but with a slightly roughened or slightly corrugated mirror surface. This measure may eventually simplify the reproducing optical device or may make possible an observation of the image on the reflector surface, without using any optical means.

In the practical application of the described reproducing device, it is advantageous that the reproducing path is spatially separated from the path of the rays which produce the radiation image. It is conceivable to have an arrangement in which the respective paths of the rays penetrate partly into each other and are directed onto the same side of the light relay. The separation of said paths has the advantage, however, that the same device can be used for several purposes. When employing swingable mirrors or the like, a motion-picture projector with a light relay may selectively be used for the reproduction of still pictures, reflected pictures, and television pictures. It is also possible to project multi-color television pictures in a simple manner. It is sufficient to use as a picture pattern the reproduced picture of a conventional three-color television picture tube and to project this picture onto the photo-cathode of the light relay. For the reproduction of the colors may also be used, as mentioned in the foregoing, two synchronously moving groups of three color filters, one group of which is arranged in front of the photo-semiconductor and the other group is arranged in front of the light modulated side of the light relay. Also here again, is the possibility of improving the color reproduction by an appropriate selection of filters.

A further use of the invention is possible when the problem is to reverse the brightness values of a given radiation image. This can be done by adjusting the light modulation effect in such a manner that the maximum brightness of the radiation image corresponds to the dark portion in the reproduced image, and the non-illuminated portions will correspond to the greatest brightness. It would only be necessary to provide in the arrangement of FIG. 5, the condition that the light passage directions of the polarizers 36 and of the analyzers 36' are arranged parallel to each other. In the device of the FIGS. 2, 9 and 10, an image reversal can be obtained by an appropriate dimensioning and adjustment of the screen diaphragm of the Schlieren system, which will block the path of light at the greatest brightness, and will open the path of light at smaller brightness condition.

When the reproduction device operates with a source of light emitting primarily ultraviolet or infrared light rays, then the device will operate as a ray transformer which will convert a visible or an invisible photographic image into an invisible image in the ultraviolet and infrared range. The application of the invention is, therefore, of interest also in photography. One may use relatively slow ultraviolet and blue-sensitive photographic material when a light relay is used as a supplementary attachment to the photographic camera, and the reproducing light is spectrally adjusted to the photo-material used. When an overloaded incandescent lamp is used as the reproducing source of light having a strong blue light portion or when a gaseous discharge tube emitting ultraviolet light, is used, ortho-chromatic films can, for instance, be used which have a slow speed. It is also possible to use ozalide paper. A conventional electronic flashlight device can also be used as the reproducing source of light in which case the flashgun can simultaneously be used as an instantaneous shutter.

What I claim is:

1. In an image reproducing device, a photo-semiconducting light ray receiving layer on one side of which is projected an optical radiation image to produce an electrical resistance image made up of numerous area portions distributed over said photo-semiconducting layer, and means forming a reflecting surface arranged on the other side of said light ray receiving layer which is illuminated by a separate source of light, said means comprising a foil coated with a mirror layer for light modulation, a support on which said foil is mounted, said support being formed of spaced parallel strips which in dependence of the resistance distribution effected by the image in said photo-semiconductive layer cause a local deformation in said foil so that micro-mirrors of different focal length are formed in the latter.

2. A device as claimed in claim 1, in which the photo-semiconducting layer is arranged electrically in series with a non-photo-electric conductive semiconductor.

3. A device as claimed in claim 1, in which said mirror layer on its face opposite the one which is coated with said foil is covered by a transparent layer the surface shape of which is controlled by an electric field.

4. A device as claimed in claim 1, including light absorbing intermediate layers arranged between said mirror layer and said photo-semiconductive layer.

5. A device as claimed in claim 1, in which the photo-semiconducting layer and the reflecting surface are each in the form of a screening structure on which said optical radiation image is projected.

6. A device as claimed in claim 1, including two electrodes in the form of an electrode scanning screen arranged on one side of said photo-semiconducting layer, a source of current for energizing said two electrodes to produce an electric direct current or alternating field.

7. A device as claimed in claim 1, in which the photo-semiconducting layer when used for the visible spectral area consists of one of the chemical elements of the group containing CdS, ZnS and $Sb_2S_3$ and the corresponding oxides of these elements.

8. A device as claimed in claim 1, in which the photo-semiconducting layer when used for the ultraviolet and X-ray field of the spectral area consists of one of the chemical elements of the group comprising Se and PbO.

9. A device as claimed in claim 1, in which the reflecting layer is made of a screen layer forming a metallic mirror such as aluminum, said metallic layer having a smooth surface suitable for directed reflection.

10. A device as claimed in claim 1, in which the reflecting layer is made of a metallic mirror layer having a roughened surface for obtaining a dispersion of the reflected light.

11. A device as claimed in claim 1, in which the illumination of the reflecting surface is effected by a cold-light mirror, and that the reproducing path of the rays is separated from the path of the illuminating rays.

12. A device as claimed in claim 1, in which the photo-semiconducting layer when used for the infrared area of the spectral area consists of one of the chemical elements of the group comprising $Tl_2S_3$, PbS, PbSe and PbTe.

13. A device as claimed in claim 1, in which the illumination of the reflecting surface is effected by a thermal reflection filter, and that the reproducing path of the rays is separated from the path of the illuminating rays.

14. In an image reproducing device, a photo-semiconducting light ray receiving layer on one side of which is projected an optical radiation image to produce an electrical resistance image made up of numerous area portions distributed over said photo-semiconducting layer, means forming a reflecting surface arranged on the other side of said light ray receiving layer which is illuminated by a separate source of light, said means comprising a foil provided with a conductive mirror surface, a strip-shaped electrode screen, and a strip-shaped photo-semiconductor arranged on a non-photo-conducting semiconductor, said foil being placed over said strip-shaped electrode screen and being electrostatically attracted by said semiconducting layer, the attraction being differently strong in accordance with the distribution of the electric field which adjusts itself in dependence of the resistance image appearing in the photo-semiconducting layer.

15. In an image reproducing device, a photo-semiconducting light ray receiving layer on one side of which is projected an optical radiation image to produce an electrical resistance image made up of numerous area portions distributed over said photo-semiconducting layer, and means forming a reflecting surface arranged on the other side of said light ray receiving layer which is illuminated by a separate source of light, said means comprising a foil coated with a mirror layer for light modulation, a support for said foil consisting of two electrodes which are of comb-shape, the teeth of which are arranged in parallel spaced relation and intermesh with each other and are mounted on a transparent carrier, said foil being coated on the side of the screen formed by said two electrodes with said photo-semiconducting layer, while said mirror layer is arranged on the other side of said foil, so that due to the heating effect caused by the photo-current, the foil will be locally deformed and will produce concave micro-mirrors.

References Cited in the file of this patent

UNITED STATES PATENTS

| | | |
|---|---|---|
| 2,391,450 | Fischer | Dec. 25, 1945 |
| 2,644,938 | Hetzel et al. | July 7, 1953 |
| 2,723,305 | Raibourn | Nov. 8, 1955 |
| 2,861,206 | Fiore et al. | Nov. 18, 1958 |

FOREIGN PATENTS

| | | |
|---|---|---|
| 778,376 | Great Britain | July 3, 1957 |